United States Patent
Bartlett

(10) Patent No.: US 8,429,875 B2
(45) Date of Patent: Apr. 30, 2013

(54) CONCRETE FOUNDATION FORM SCREW AND METHOD OF USE

(75) Inventor: Dameon Bartlett, Santa Cruz, CA (US)

(73) Assignees: Dameon Bartlett, Santa Cruz, CA (US); Donald Hays, Santa Cruz, CA (US)

( * ) Notice: Subject to any disclaimer, the term of this patent is extended or adjusted under 35 U.S.C. 154(b) by 270 days.

(21) Appl. No.: 12/778,047

(22) Filed: May 11, 2010

(65) Prior Publication Data
US 2011/0056166 A1    Mar. 10, 2011

Related U.S. Application Data

(60) Provisional application No. 61/276,276, filed on Sep. 9, 2009.

(51) Int. Cl.
*E04G 21/00* (2006.01)
*F16B 23/00* (2006.01)

(52) U.S. Cl.
USPC .................. 52/741.1; 411/403; D8/387

(58) Field of Classification Search ........... 411/387.1, 411/387.2, 387.6, 401, 402, 403, 393, 394, 411/482; D8/387, 391; 52/741.1, 745.05
See application file for complete search history.

(56) References Cited

U.S. PATENT DOCUMENTS

| | | | | |
|---|---|---|---|---|
| D8,036 S | * | 2/1875 | Ray | D8/387 |
| 411,000 A | * | 9/1889 | Anderson | 411/402 |
| D31,894 S | * | 11/1899 | Dixon | D8/387 |
| 652,794 A | * | 7/1900 | Lowe | 411/361 |
| D42,602 S | * | 6/1912 | Hagen | D8/387 |
| 1,149,141 A | * | 8/1915 | Hook | 248/489 |
| 1,204,173 A | * | 11/1916 | McMeekin | 24/591.1 |
| 2,034,573 A | * | 3/1936 | Goehring | 137/625.3 |
| 3,186,293 A | * | 6/1965 | Curry | 411/401 |
| 3,229,335 A | * | 1/1966 | Thome | 403/19 |
| 3,283,638 A | | 11/1966 | Ansingh | |
| D207,123 S | * | 3/1967 | Flood | D8/387 |
| 3,469,491 A | * | 9/1969 | Munsey | 411/422 |
| 4,093,285 A | * | 6/1978 | Fayle | 292/251 |
| D248,824 S | * | 8/1978 | Imai et al. | D8/387 |
| 5,295,774 A | * | 3/1994 | Roberts | 411/387.2 |
| 5,302,068 A | | 4/1994 | Janusz et al. | |
| 5,672,178 A | * | 9/1997 | Petersen | 606/75 |
| 5,697,746 A | | 12/1997 | Brown et al. | |
| 6,109,850 A | * | 8/2000 | Commins | 411/387.2 |
| 6,296,433 B1 | * | 10/2001 | Forsell et al. | 411/386 |
| D480,951 S | * | 10/2003 | Robinson | D8/387 |
| 6,746,186 B2 | | 6/2004 | Ukai | |
| 6,854,942 B1 | | 2/2005 | Hargis | |

(Continued)

*Primary Examiner* — Michael Safavi
(74) *Attorney, Agent, or Firm* — Kilpatrick Townsend & Stockton LLP

(57) ABSTRACT

A protruding-head fastener is disclosed for joining two or more members. A protruding-head fastener includes a head that protrudes when the fastener is installed and shaped to rotationally couple with a drive tool, and a shank fixedly coupled with the protruding head and having a self-tapping threaded portion and a maximum diameter. The protruding head and the shank define a longitudinal axis through the fastener. The protruding head has a length along the longitudinal axis and a maximum width transverse to the longitudinal axis such that the length divided by the maximum width defines an aspect ratio for the protruding head that is equal to or greater than 1.0. The protruding head further has a minimum width that is greater than the maximum diameter of the shank. In many embodiments, the minimum width of the protruding head exceeds 1.2 times the maximum diameter of the shank.

24 Claims, 5 Drawing Sheets

U.S. PATENT DOCUMENTS

| | | | |
|---|---|---|---|
| 6,889,580 B1 * | 5/2005 | Tseng | 81/124.6 |
| 6,966,737 B2 * | 11/2005 | McGovern et al. | 411/413 |
| 7,025,551 B2 * | 4/2006 | Haytayan | 411/442 |
| D551,543 S * | 9/2007 | Williams et al. | D8/387 |
| D585,731 S * | 2/2009 | Carrillo et al. | D8/387 |
| D602,161 S * | 10/2009 | Yazdi | D24/156 |
| 7,713,013 B2 * | 5/2010 | Sedgwick et al. | 411/411 |
| 7,883,307 B2 * | 2/2011 | Pippard et al. | 411/387.1 |
| D639,645 S * | 6/2011 | Carrillo et al. | D8/387 |
| 2001/0009638 A1 | 7/2001 | Crawford et al. | |
| 2005/0249572 A1 | 11/2005 | Virgl et al. | |
| 2005/0260058 A1 | 11/2005 | Cassagne, III | |
| 2006/0228189 A1 * | 10/2006 | Lin | 411/402 |
| 2007/0031209 A1 * | 2/2007 | Craven et al. | 411/402 |
| 2007/0183866 A1 * | 8/2007 | Gallien | 411/401 |
| 2009/0148254 A1 * | 6/2009 | Carrillo et al. | 411/404 |
| 2010/0239386 A1 * | 9/2010 | Sedgwick et al. | 411/402 |

* cited by examiner

CONCRETE FOUNDATION FORM SCREW AND METHOD OF USE

CROSS-REFERENCES TO RELATED APPLICATIONS

This application claims the benefit of U.S. Provisional Patent Application No. 61/276,276, filed Sep. 9, 2009, entitled "Concrete Foundation Form Screw," the full disclosure of which is hereby incorporated herein by reference.

BACKGROUND

The present invention relates generally to removable screws, and more particularly to removable screws having an elongated protruding head. The disclosed removable screws may be particularly effective for use in assembling wood forms used to form concrete.

Current methods for assembling concrete forms often involve the use of common duplex nails and/or common wood screws. For example, a wood form board can be stabilized by attaching a stake (e.g., metal, wood) to the form board via common duplex nails. A wood form board can also be attached to an adjacent wood form board via common duplex nails. FIG. 1 illustrates an installed common duplex nail 2 joining a wood stake 4 to a form board 6. After the concrete has been poured and sufficiently cured, the concrete forms are disassembled by removing the common duplex nails.

There are, however, some problems associated with the use of common duplex nails to assemble concrete forms. For example, while a duplex nail is easy to remove from stakes and form boards, it may be cumbersome to insert. In addition, when using duplex nails, a stake may come loose from a form board and/or a form board may come loose from another form board. When used with wood stakes, the duplex nails may cause the stakes to split.

With the advent cordless drills, common wood screws have been used to attach stakes to form boards and/or to attach form boards to other form boards. Screws may be easy to insert than duplex nails in some instances and allow for a stronger and tighter bond between the stake and form board (and between form boards).

The common wood screw, however, may be more difficult to remove than a duplex nail during disassembly of a concrete form. The head of the screw may get buried into a form member to an extent that it cannot be reached for removal. The head of the screw may become occluded with concrete such that a removal bit cannot be inserted into the screw head. The head of the screw may also become stripped. When used with a wood stake, the common wood screw may also cause the stake to split.

As such, there is a need for an improved removable fastener, particularly one that can be used to assemble concrete forms.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Removable fasteners are disclosed that have an elongated protruding head and self-tapping threads. The disclosed fasteners can be used to, for example, assembly concrete forms (e.g., to securely fasten a stake to a form board and/or to securely fastener one form board to another form board). The elongated protruding head facilitates removal of the fastener by increasing the likelihood that the head can be reached by a drive tool (e.g., a matching socket attached to a cordless drill). The disclosed fasteners share beneficial attributes of the common wood screw (e.g., easy to insert, creates a strong/tight bond between a stake and a form board and/or between form boards, a reduced tendency to split a wooden stake as compared to a duplex nail) without the above-discussed downsides of the common wood screw (e.g., difficult to remove when buried, occluded with concrete, and/or stripped). In many embodiments where the protruding head includes external drive features (e.g., a hex head), the disclosed fasteners may be significantly easier to install than a common wood screw due to the external drive features tending to stay in engagement with a drive tool (e.g., a socket) more readily than, for example, a Phillips head drive tool with a cross-recessed head of a wood screw. The disclosed fasteners may be significantly more easily removed than common wood screws even if the elongated head gets concrete on it. The elongated head of the disclosed fasteners may be significantly more resistant to stripping than a common wood screw, and may provide a surface that can be gripped and twisted to remove the fastener even if the head becomes stripped.

Thus, in a first aspect, a protruding-head fastener is disclosed for joining two or more members. The fastener includes a head that protrudes when the fastener is installed and shaped to rotationally couple with a drive tool, and a shank fixedly coupled with the protruding head and having a self-tapping threaded portion and a maximum diameter. The protruding head and the shank define a longitudinal axis through the fastener. The protruding head has a length along the longitudinal axis and a maximum width transverse to the longitudinal axis such that the length divided by the maximum width defines an aspect ratio for the protruding head that is equal to or greater than 1.0. The protruding head further has a minimum width that is greater than the maximum diameter of the shank. In many embodiments, the minimum width of the protruding head exceeds 1.2 times the maximum diameter of the shank. In many embodiments, the threaded portion includes a wood-screw thread. In many embodiments, the shank includes a cutting tip.

In many embodiments, the aspect ratio of the head exceeds 1.0. For example, the aspect ratio of the head can be equal to or greater than, for example, 1.2 and/or 1.4.

In many embodiments, the protruding head includes an external drive feature. For example, the protruding head can include an external portion that is non-circular when viewed along the longitudinal axis and shaped to rotationally couple with a drive tool. The external portion can be a regular polygon when viewed along the longitudinal axis. The external portion can have a hexagonal configuration when viewed along the longitudinal axis. The protruding head can include two non-circular external portions that are separated by an external portion that is recessed relative to the non-circular external portions. The recessed external portion can include a circular cross-section oriented perpendicular to the longitudinal axis.

The protruding head can include a recessed-drive feature. The recessed-drive feature can be, for example, non-circular when viewed along the longitudinal axis and shaped to rotationally couple with a drive tool. The recessed-drive feature can have, for example, a cross-recess configuration, a square-drive configuration, or a star-drive configuration.

In many embodiments, the fastener further includes a head base fixedly coupled with the protruding head and the shank and disposed between the protruding head and the shank. The head base can include, for example, a circular cross-section oriented perpendicular to the longitudinal axis and having a diameter greater than a major diameter of the threaded portion. The diameter of the circular cross-section can be greater than the maximum width of the protruding head. The head base can include an external surface that is axially symmetric to the longitudinal axis. The axially-symmetric surface can include an annular surface oriented within 30 degrees from perpendicular to the longitudinal axis and configured to apply a compressive force to a member when installed in the member. The annular surface can be oriented perpendicular to the longitudinal axis.

In many embodiments, the shank of the fastener includes an unthreaded upper portion. The unthreaded upper portion can be, for example, 30 to 60 percent of an overall length of the shank, and more preferably 35 to 52.5 percent of the overall length.

In another aspect, a structure is disclosed for forming concrete. The structure includes a first member having a surface providing a concrete forming boundary and a second member coupled with the first member via one or more protruding-head fasteners to constrain the first member. Each of the protruding-head fasteners includes a head that protrudes when the fastener is installed and shaped to rotationally couple with a drive tool, and a shank fixedly coupled with the protruding head and having a self-tapping threaded portion and a maximum diameter. The protruding head and the shank define a longitudinal axis through the fastener. The protruding head has a length along the longitudinal axis and a maximum width transverse to the longitudinal axis such that the length divided by the maximum width defines an aspect ratio for the protruding head that is equal to or greater than 1.0. The protruding head further has a minimum width that is greater than the maximum diameter of the shank.

In another aspect, a method is disclosed for forming concrete. The method includes positioning a first member having a concrete forming surface, stabilizing the first member with a second member by coupling the second member to the first member via one or more protruding-head threaded fasteners, forming concrete against the concrete forming surface, and uncoupling the first and second members by rotating the protruding head of the fastener to remove the fastener from at least one of the first or second members. Each of the one or more protruding-head fasteners include a protruding head having a length along a longitudinal axis of the fastener that exceeds a maximum width of the protruding head transverse to the longitudinal axis. Each protruding head further has a minimum width that is greater than a maximum diameter of a shank of the fastener.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. The present invention, however, can be practiced without the specific details. Furthermore, well-known features may be omitted or simplified in order not to obscure the embodiment being described.

Figure 1:
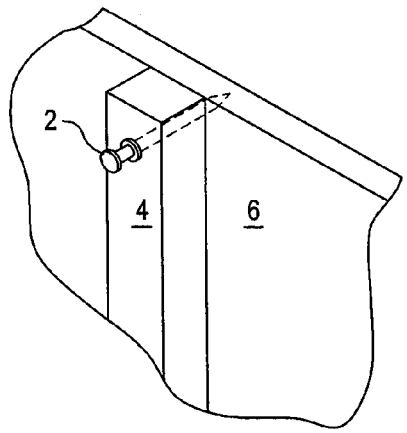
FIG. 1 is a perspective view illustrating an installed common duplex nail joining two form members.
Figure 2:
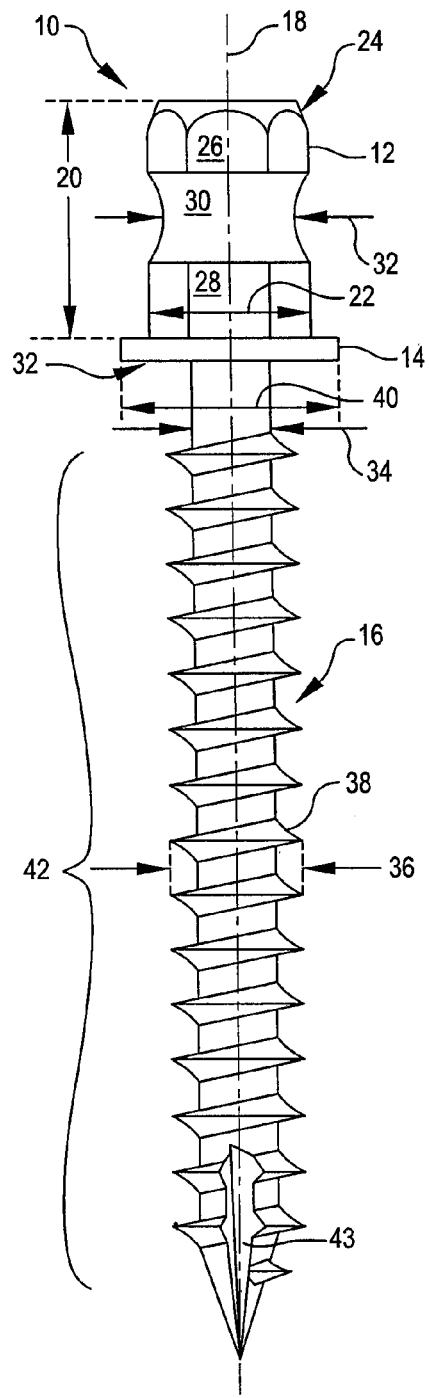
FIG. 2 is a side view illustrating a protruding-head fastener for joining two or more members, in accordance with many embodiments.

Referring now to the drawings, in which like reference numerals represent like parts throughout the several views, FIG. 2 shows a protruding-head fastener 10 for joining two or more members, in accordance with many embodiments. The protruding-head fastener 10 includes an elongated protruding head 12, a head base 14 fixed to the head 12, and a shank 16 fixed to the head base 14. The head 12, the head base 14, and the shank 16 are aligned along a longitudinal axis 18.

The elongated protruding head 12 can have an aspect ratio that is equal to or greater than 1.0. The aspect ratio is defined as a length 20 of the protruding head 12 along the longitudinal axis 18 divided by a maximum width 22 of the protruding head 12 transverse to the longitudinal axis 18. The aspect ratio for the protruding head 12 can be at least one of, for example, equal to or greater than 1.0, equal to or greater than 1.2, or equal to or greater than 1.4. The protruding head 12 illustrated in FIG. 2 has an aspect ratio of approximately 1.5.

The head 12 is shaped to rotationally couple with a drive tool. In many embodiments, the head 12 includes an external portion that is non-circular when viewed along the longitudinal axis and shaped to rotationally couple with a drive tool (e.g., a socket coupled to a drive source such as a socket wrench, a cordless drill, a pneumatically-driven driver). The external portion can have, for example, a configuration of a regular polygon (e.g., hexagonal) when viewed along the longitudinal axis 18. While a hexagonal shape is illustrated, the external portion can have any suitable non-circular shape (e.g., square, twelve-point, and the like) that can couple with a suitable drive tool.

The top of the head 12 can be shaped to facilitate coupling of the head with a drive tool. For example, the top of the head 12 includes a shaped portion 24 that is chamfered or rounded such that a drive tool can be more easily coupled to and/or decoupled from the head 12.

The head 12 can include two or more non-circular external portions that are separated by one or more external portions that are recessed relative to the non-circular portions. For example, the head 12 can include a first hexagonal external portion 26 that is separated from a second hexagonal external portion 28 by a centrally-disposed external portion 30 that is recessed relative to the external portions 26, 18. The one or more recessed external portions can have a minimum width 32 that is, for example, greater than a shank maximum diameter 34 or greater than a major diameter 36 of a thread 38. The recessed external portion 30 can have any suitable shape (e.g., the recessed external portion 30 can include a circular cross-section oriented perpendicular to the longitudinal axis 18; the recessed external portion 30 can have an external surface that is axially-symmetric to the longitudinal axis 18). The recessed external portion 30 can be used to reduce the amount of material used to form the fastener, and may serve to provide an exterior profile for the head 12 from which concrete is more easily dislodged from at least the first hexagonal external portion 26 to allow the first hexagonal external portion 26 to couple with a drive tool. The recessed external portion 30 also allows a drive tool (e.g., socket) to more easily be coupled to and/or decoupled from the head 12 when the drive tool is at an angle to the longitudinal axis 18.

The head base 14 provides a transitional structure between the head 12 and the shank 16. The head base 14 can include a cylindrical section with a diameter 40. In many embodiments, the head-base diameter 40 is greater that the major diameter 34 of the shank 16, and can be greater than the maximum width 22 of the head 12. A head base 14 that is wider than the major diameter 34 or even wider than the head 12 allows for installation of the fastener so as to create a strong/tight bond between joined members without having the head 12 sink too deep into a member. In many embodiments, the head base 14 is shaped to apply a compressive force to a member when the fastener 10 is installed in the member. As the fastener 10 is installed, contact between the head base 14 and the member results in contact forces between the head base and the member. These contact forces generate tension along the fastener 10 and thereby pulling the two or more joined members together. In many embodiments, the head base 14 has an external shape that is axial symmetric to the longitudinal axis 18, which serves to reduce the amount of rotational torque required to install the fastener 10.

The shank 16 includes a threaded portion 42 having a self-tapping thread 38 and the maximum diameter 34 that can be, for example, occur along a portion of the shank 16 and/or can be disposed adjacent to the head base 14. In many embodiments, the self-tapping thread 38 includes a wood-screw thread. The self-tapping thread 38 has the major diameter 36. The shank 16 can include a cutting tip 43, which may help to reduce any tendency to split a wood stake by removing wood along a boring path of the shank 16, thereby reducing internal compression in the wood radial to the shank 16.

Figure 3:
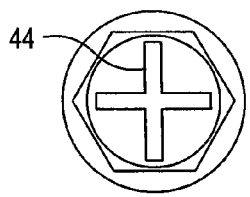
FIG. 3 is an end view illustrating a recessed-drive feature having a cross-recessed configuration in a head of a protruding-head fastener for joining two or more members, in accordance with many embodiments.
Figure 4:
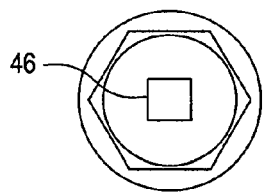
FIG. 4 is an end view illustrating a recessed-drive feature having a square-drive configuration in a head of a protruding-head fastener for joining two or more members, in accordance with many embodiments.
Figure 5:
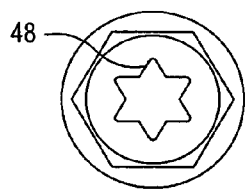
FIG. 5 is an end view illustrating a recessed-drive feature having a star-drive configuration in a head of a protruding-head fastener for joining two or more members, in accordance with many embodiments.
Figure 6:
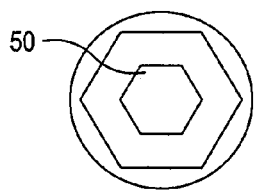
FIG. 6 is an end view illustrating a recessed-drive feature having a socket head (Allen) configuration in a head of a protruding-head fastener for joining two or more members, in accordance with many embodiments.

The head 12 can include a recessed-drive feature shaped to rotationally couple with a drive tool. FIGS. 3 through 6 illustrate some examples of recessed-drive features that can be used. FIG. 3 illustrates a recessed-drive feature 44 having a cross-recessed configuration that can be driven by a Phillips head drive tool. FIG. 4 illustrates a recessed-drive feature 46 having a square-drive configuration. FIG. 5 illustrates a recessed-drive feature 48 having a star-drive configuration. And FIG. 6 illustrates a recessed-drive feature 50 having a hex socket (Allen) configuration. Any suitable recessed-drive feature that is non-circular when viewed along the longitudinal axis can be used. For example, a recessed-drive feature can include any suitable known drive feature (e.g., slotted, pozidriv (SupaDriv), hex socket (Allen), torx, tri-wing, torq-set, spanner head (snake-eye), triple square, polydrive, one-way, spline drive, double hex, bristol).

Figure 7:
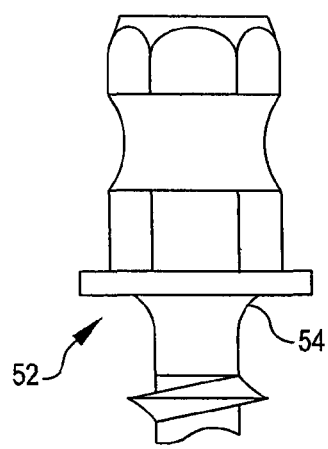
FIG. 7 is a side view illustrating an alternate configuration for a head base, in accordance with many embodiments.
Figure 8:
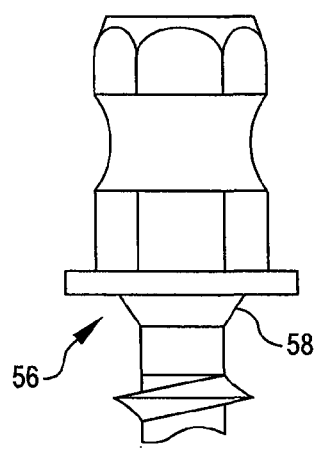
FIG. 8 is a side view illustrating an alternate configuration for a head base, in accordance with many embodiments.
Figure 9:
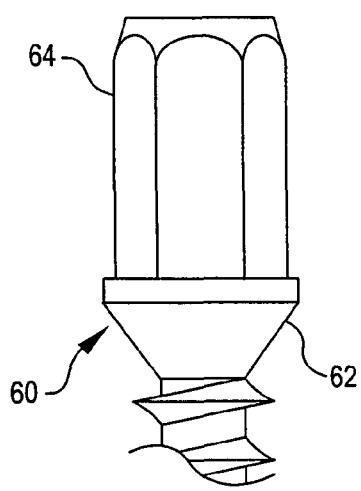
FIG. 9 is a side view illustrating an alternate configuration of a head and a head base, in accordance with many embodiments.
Figure 10:
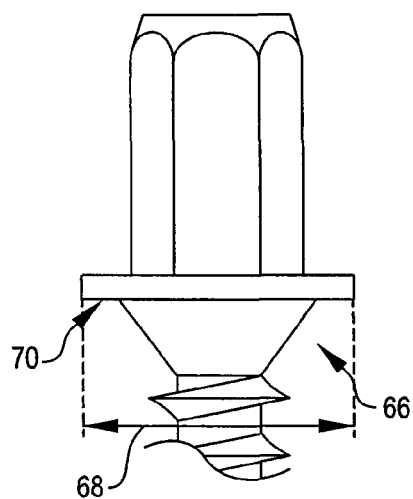
FIG. 10 is a side view illustrating an alternate configuration of a head base, in accordance with many embodiments.
Figure 11:
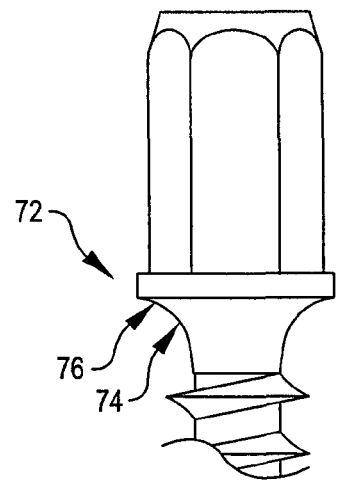
FIG. 11 is a side view illustrating an alternate configuration of a head base, in accordance with many embodiments.

Various suitable configurations of the head base can be employed. For example, FIGS. 7 through 11 illustrate some example configurations of the head base. The head base 52 illustrated in FIG. 7 is similar to the head base 14 illustrated in FIG. 2, but further includes a progressively-curved transition region 54 that may help to locally strengthen the fastener and reduce local stress concentrations. The head base 56 illustrated in FIG. 8 is similar to the head base 52, but includes a conically-shaped transition region 58. FIG. 9 illustrates a head base 60 that includes a large conically-shaped transition region 62. The transition region 62 is aligned axially symmetric with the longitudinal axis 18 and expands outward from the shank to a cylindrical section of the head base 60. FIG. 9 also illustrates a protruding head that does not include a centrally disposed recessed region. FIG. 10 illustrates a head base 66 configured similar to the head base 60, but has a cylindrical section with diameter 68 that is increased relative to the head base 60. The increased diameter 68 provides an annular surface 70 that is oriented perpendicular to the longitudinal axis 18. Such an annular surface 70 may provide for increased clamping force between joined members by increasing the interfacing surface area of the head and/or aligning the resulting contact forces with the longitudinal axis so as to more effectively generate tension along the fastener and thereby increase the resulting clamping forces between the joined members. The head base 72 illustrated in FIG. 11 has a progressively curved external surface 74 that includes an annular surface 76 oriented within 30 degrees from perpendicular to the longitudinal axis 18. The annular surface 76 is disposed at the outer limits of the curved external surface 74. An annular surface 30 oriented to be relatively close to perpendicular to the longitudinal axis 18 may serve to apply contact compressive forces that are more aligned with the longitudinal axis 18 and thereby more effective in developing clamping force between the joined members.

Figure 12:
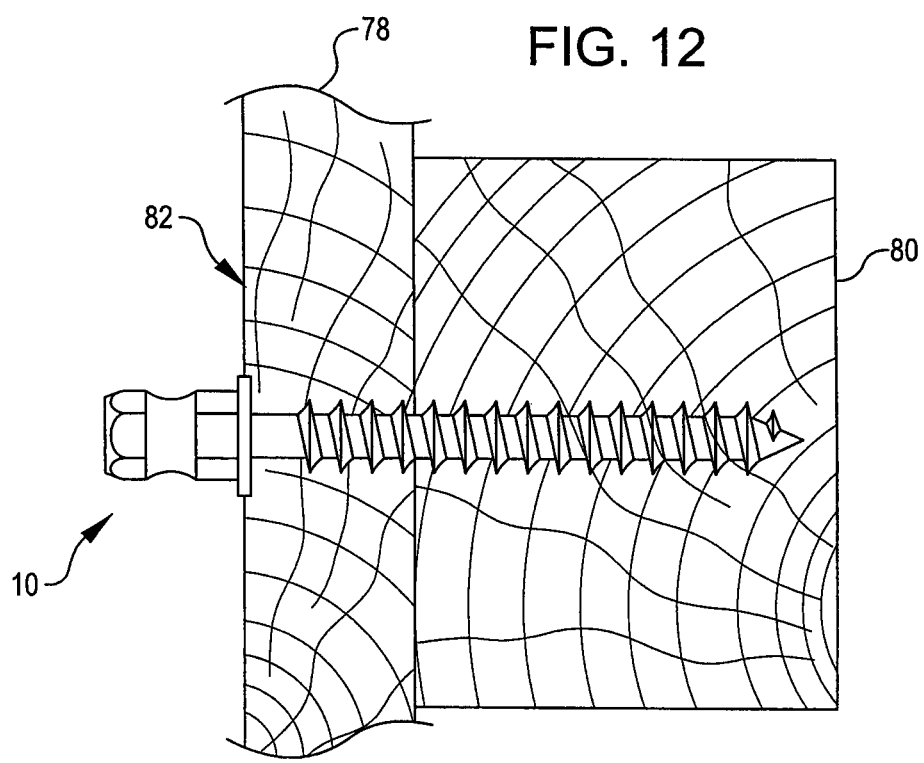
FIG. 12 is a side view illustrating the fastener of FIG. 2 joining two wood members, in accordance with many embodiments.

FIG. 12 illustrates the fastener 10 of FIG. 2 as installed to join two wood members 78, 80, in accordance with many embodiments. To install the fastener 10, a drive tool (e.g., a socket coupled with a source of rotation) can be used to rotate the fastener 10 so that the self-tapping threads pull the fastener 10 into the members 78, 80. The fastener 10 can be installed such that the head base 14 presses against the member 78. To generate increased levels of fastener generated clamping force between the members 78, 80, the fastener can be installed such that the head base 14 is partially and/or fully embedded within the member 78 (e.g., the top of the head base 14 is disposed at or below the adjacent exterior surface 82 of the member 78). The elongated shape of the head 12 allows the top of the head base 14 to be disposed a distance below the adjacent exterior surface 82 of the member 78 while still extending above the exterior surface 82 and therefore accessible for coupling with a drive tool for removal of the fastener 10.

Figure 13:
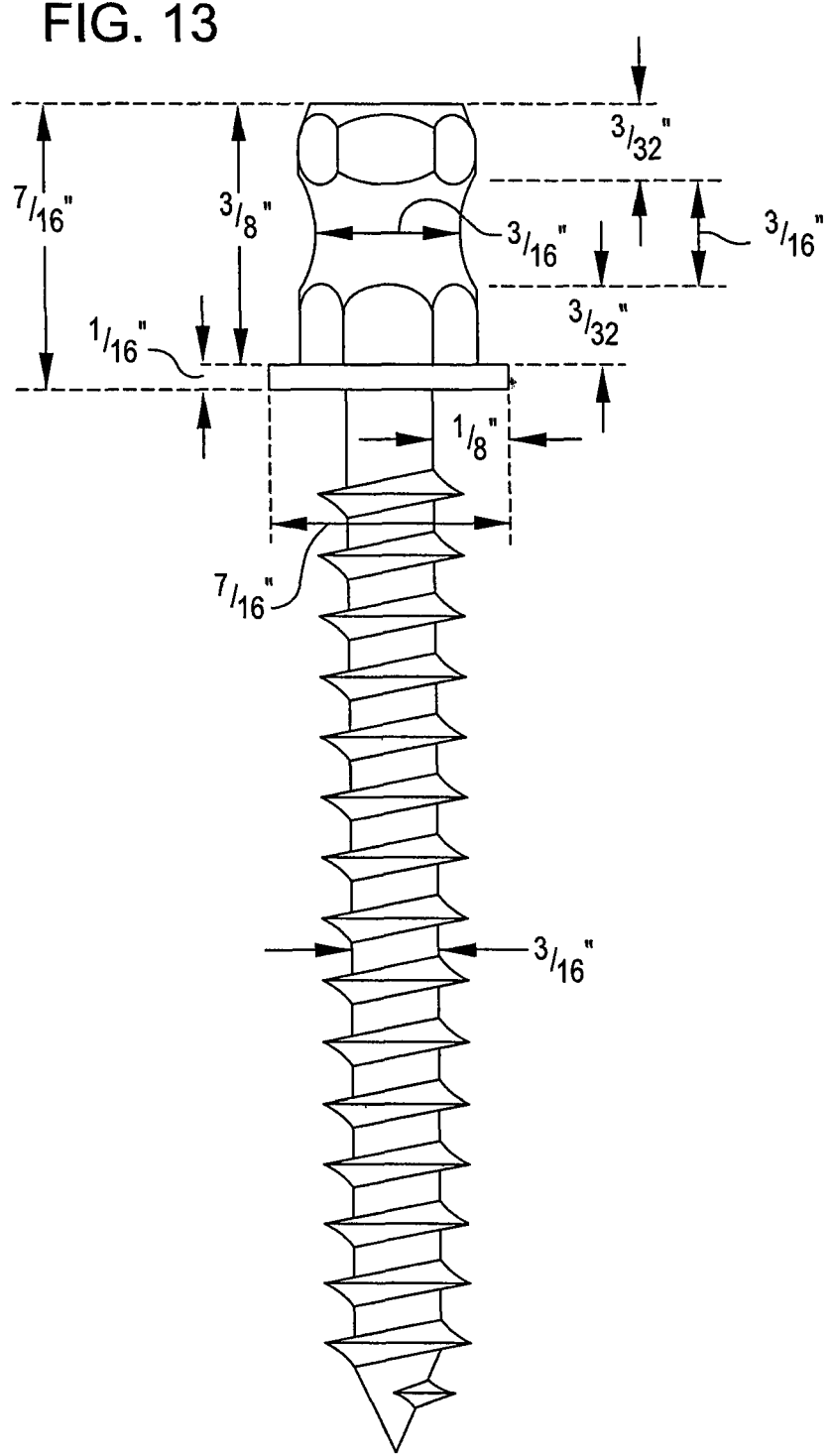
FIG. 13 illustrates dimensions of some embodiments of a protruding head fastener for joining two or more members.

The disclosed fasteners can be suitably sized for the members to be joined. For example, fasteners for use in joining concrete form members can have fastener heads configured to be driven by socket sizes from 3/16 to 1 inch, and more typically about 1/4 inch. As a non-limiting example, FIG. 13 illustrates dimensions of some presently preferred embodiments of a protruding-head fastener 10 for joining two or more members. In many embodiments, a protruding head fastener has a shank length of 2 to 3 inches.

Figure 14:
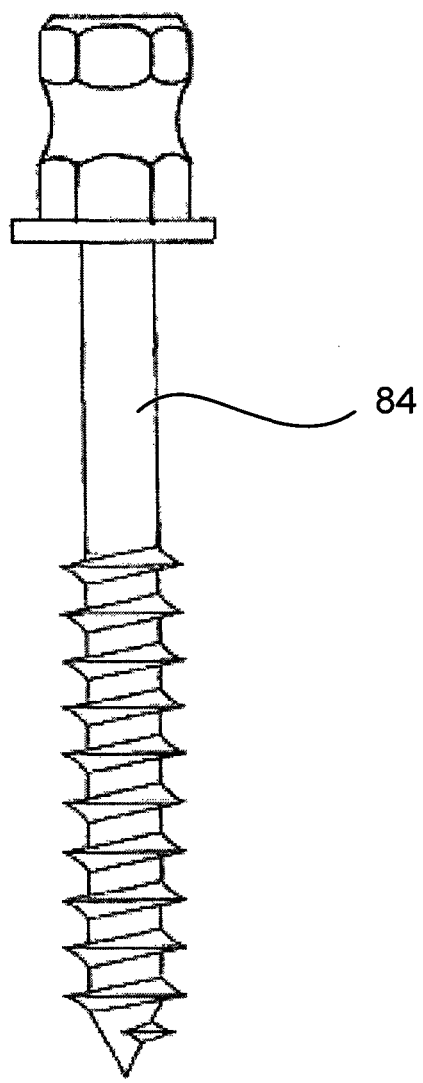
FIG. 14 illustrates a protruding head fastener having an unthreaded upper shank portion, in accordance with many embodiments.

As illustrated in FIG. 14, the disclosed fasteners can also have a shank that includes an unthreaded upper portion 84. In some instances, a gap exists between a form stake and a form board prior to installing a fastener into the form stake and form board. If such a gap is not eliminated prior to installing a fastener having a fully-threaded shank, the engagement of the threads in both the form stake and the form board may inhibit closing of the gap. By providing a suitably sized unthreaded upper portion 84, the fastener threads will only engage the form board and the clamping action of the protruding head against the form stake can more effectively clamp the form stake to the form board, and may thereby reduce and/or eliminate any gap. The length of the unthreaded upper portion can be suitably sized based on the members being joined and/or the length of the fastener shank (e.g., a three-quarter inch long unthreaded portion for a two inch long shank, a one and one-half inch long unthreaded portion for a three inch long, shank). The length of the unthreaded upper portion can, for example, range from about 30 to 60 percent of the overall shank length, and more preferably range from 35 to 52.5 percent of the overall shank length.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A protruding-head fastener for joining two or more members, the fastener comprising:
   a head that protrudes when the fastener is installed and shaped to rotationally couple with a drive tool, wherein the protruding head comprises a top chamfered portion and two external portions, the two external portions being non-circular when viewed along the longitudinal axis, shaped to rotationally couple with a drive tool, and separated by a recessed external portion that is recessed relative to the non-circular external portions, such that, when a tool is coupled with the head at an angle to a longitudinal axis of the fastener, one side of the tool extends into the recessed external portion and an opposite side of the tool fits against the chamfered portion; and
   a shank fixedly coupled with the protruding head and having a self-tapping threaded portion and a maximum diameter, the protruding head and the shank defining the longitudinal axis through the fastener, the protruding head having a length along the longitudinal axis and a maximum width transverse to the longitudinal axis, the length divided by the maximum width defining an aspect ratio for the protruding head that is equal to or greater than 1.0, the protruding head further having a minimum width that is greater than the maximum diameter of the shank.

2. The fastener of claim 1, wherein the minimum width of the protruding head exceeds 1.2 times the maximum diameter of the shank.

3. The fastener of claim 1, wherein the aspect ratio is equal to or greater than 1.2.

4. The fastener of claim 3, wherein the aspect ratio is equal to or greater than 1.4.

5. The fastener of claim 1, wherein the two external portions that are separated by the recessed external portion have the same non-circular shape when viewed along the longitudinal axis.

6. The fastener of claim 1, wherein at least one external portion has the configuration of a regular polygon when viewed along the longitudinal axis.

7. The fastener of claim 6, wherein the external portion has a hexagonal configuration when viewed along the longitudinal axis.

8. The fastener of claim 1, wherein the the recessed external portion comprises a minimum width that is greater than the maximum diameter of the shank.

9. The fastener of claim 1, wherein the recessed external portion comprises a circular cross-section oriented perpendicular to the longitudinal axis.

10. The fastener of claim 1, wherein the protruding head comprises a recessed-drive feature that is non-circular when viewed along the longitudinal axis and shaped to rotationally couple with a drive tool.

11. The fastener of claim 10, wherein the recessed-drive feature has a cross-recess configuration.

12. The fastener of claim 10, wherein the recessed-drive feature has a square drive configuration.

13. The fastener of claim 10, wherein the recessed-drive feature has a star drive configuration.

14. The fastener of claim 1, wherein the threaded portion comprises a wood-screw thread.

15. The fastener of claim 1, further comprising a head base fixedly coupled with the protruding head and the shank and disposed between the protruding head and the shank, the head base comprising a circular cross-section oriented perpendicular to the longitudinal axis and having a diameter greater than a major diameter of the threaded portion.

16. The fastener of claim 15, wherein the head base comprises an external surface that is axially symmetric to the longitudinal axis.

17. The fastener of claim 16, wherein the axially-symmetric surface comprises an annular surface oriented within 30 degrees from perpendicular to the longitudinal axis and configured to apply a compressive force to a member when installed in the member.

18. The fastener of claim 16, wherein the diameter of the circular cross section is greater than the maximum width of the protruding head.

19. The fastener of claim 17, wherein the annular surface is oriented perpendicular to the longitudinal axis.

20. The fastener of claim 1, wherein the shank comprises a cutting tip.

21. The fastener of claim 1, wherein the shank has an overall length and comprises an unthreaded upper portion having a length that is 30 to 60 percent of the overall length.

22. The fastener of claim 21, wherein the unthreaded upper portion has a length that is 35 to 52.5 percent of the overall length.

23. A structure for forming concrete, the structure comprising:
    a first member having a surface providing a concrete forming boundary; and
    a second member coupled with the first member via one or more protruding-head fasteners to constrain the first member, each of the one or more protruding-head fasteners comprising
        a head that protrudes when the fastener is installed and shaped to rotationally couple with a drive tool, wherein the protruding head comprises a top chamfered portion and two external portions, the two external portions being non-circular when viewed along the longitudinal axis, shaped to rotationally couple with a drive tool, and separated by a recessed external portion that is recessed relative to the non-circular external portions, such that, when a tool is coupled with the head at an angle to a longitudinal axis of the fastener, one side of the tool extends into the recessed external portion and an opposite side of the tool fits against the chamfered portion; and
        a shank fixedly coupled with the protruding head and having a self-tapping threaded portion and a maximum diameter, the protruding head and the shank defining the longitudinal axis through the fastener, the protruding head having a length along the longitudinal axis and a maximum width transverse to the longitudinal axis, the length divided by the maximum width defining an aspect ratio for the protruding head that is equal to or greater than 1.0, the protruding head further having a minimum width that is greater than the maximum diameter of the shank.

24. A method for forming concrete, the method comprising:
    positioning a first member having a concrete forming surface;
    stabilizing the first member with a second member by coupling the second member to the first member via one or more protruding-head threaded fasteners, each of the one or more protruding-head fasteners comprising a protruding head having a length along a longitudinal axis of the fastener that exceeds a maximum width of the protruding head transverse to the longitudinal axis, each protruding head further having a minimum width that is greater than a maximum diameter of a shank of the fastener, the shank fixedly coupled with the protruding head and having a self-tapping threaded portion, each protruding head further having a top chamfered portion and two external portions, the two external portions being non-circular when viewed along the longitudinal axis, shaped to rotationally couple with a drive tool, and separated by a recessed external portion that is recessed relative to the non-circular external portions, such that, when a tool is coupled with the head at an angle to a longitudinal axis of the fastener, one side of the tool extends into the recessed external portion and an opposite side of the tool fits against the chamfered portion;
    forming concrete against the concrete forming surface; and
    uncoupling the first and second members by rotating the protruding head of the fastener to remove the fastener from at least one of the first or second members.

* * * * *